United States Patent
Noguchi

(10) Patent No.: US 11,334,298 B2
(45) Date of Patent: May 17, 2022

(54) IMAGE LAYOUT SIZE CALCULATION APPARATUS, IMAGE LAYOUT SIZE CALCULATION METHOD, IMAGE LAYOUT SIZE CALCULATION PROGRAM, AND RECORDING MEDIUM STORING THE PROGRAM

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 65 days.

(21) Appl. No.: 17/022,498

(22) Filed: Sep. 16, 2020

(65) Prior Publication Data

US 2020/0409619 A1 Dec. 31, 2020

Related U.S. Application Data

(63) Continuation of application No. PCT/JP2019/009587, filed on Mar. 11, 2019.

(30) Foreign Application Priority Data

Mar. 30, 2018 (JP) .............................. JP2018-066739

(51) Int. Cl.
*G06F 3/12* (2006.01)
*G06T 3/40* (2006.01)
(Continued)

(52) U.S. Cl.
CPC ............ *G06F 3/1208* (2013.01); *G06F 3/125* (2013.01); *G06F 3/1242* (2013.01); *G06T 3/40* (2013.01); *G06T 5/003* (2013.01); *G06T 11/60* (2013.01)

(58) Field of Classification Search
CPC ...................................................... G06F 3/1208
(Continued)

(56) References Cited

U.S. PATENT DOCUMENTS 6,392,759 B1    5/2002   Kuwata et al.
7,304,754 B1   12/2007   Nakamura et al.
(Continued)

FOREIGN PATENT DOCUMENTS

JP    2001-036843 A    2/2001
JP    2003-250040 A    9/2003
(Continued)

OTHER PUBLICATIONS

International Search Report issued in PCT/JP2019/009587; dated Jun. 4, 2019.
Written Opinion issued in PCT/JP2019/009587; dated Jun. 4, 2019.

*Primary Examiner* — Jacky X Zheng
(74) *Attorney, Agent, or Firm* — Studebaker & Brackett PC

(57) ABSTRACT

Provided are an image layout size calculation apparatus, an image layout size calculation method, and an image layout size calculation program which are capable of outputting an image with a small blurriness degree. A blurriness value is calculated for each image area, and the smallest blurriness value is decided (step S24). Resolution of a printer that prints the image is read (step S25). A layout size in which the blurriness value is equal to or smaller than a second threshold value is calculated based on the number of pixels of the image, the decided blurriness value, and the resolution of the printer (step S26). By printing the image having a size equal to or smaller than the calculated layout size, the blurriness degree of the printed image is reduced.

13 Claims, 15 Drawing Sheets

(51) Int. Cl.
*G06T 5/00* (2006.01)
*G06T 11/60* (2006.01)
(58) Field of Classification Search
USPC ........................................... 358/1.15
See application file for complete search history.

(56) References Cited

U.S. PATENT DOCUMENTS

| | | |
|---|---|---|
| 2003/0161628 A1 | 8/2003 | Ito et al. |
| 2005/0248655 A1* | 11/2005 | Kitamura ........... H04N 5/23258 348/187 |
| 2014/0281965 A1* | 9/2014 | Yamaji .................. G06F 16/50 715/708 |
| 2016/0021298 A1* | 1/2016 | Tsutsumi ........... H04N 5/23212 348/349 |
| 2016/0248984 A1 | 8/2016 | Li et al. |

FOREIGN PATENT DOCUMENTS

| | | |
|---|---|---|
| JP | 2004-023322 A | 1/2004 |
| JP | 2005-236808 A | 9/2005 |
| JP | 2005-332383 A | 12/2005 |
| JP | 2007-249329 A | 9/2007 |
| JP | 2008-167461 A | 7/2008 |
| JP | 2011-035514 A | 2/2011 |
| JP | 2013-143661 A | 7/2013 |
| JP | 2014-199641 A | 10/2014 |
| JP | 2015-156189 A | 8/2015 |
| JP | 2016-024489 A | 2/2016 |
| JP | 2018-508898 A | 3/2018 |

* cited by examiner

IMAGE LAYOUT SIZE CALCULATION APPARATUS, IMAGE LAYOUT SIZE CALCULATION METHOD, IMAGE LAYOUT SIZE CALCULATION PROGRAM, AND RECORDING MEDIUM STORING THE PROGRAM

CROSS-REFERENCE TO RELATED APPLICATIONS

This application is a Continuation of PCT International Application No. PCT/JP2019/009587 filed on Mar. 11, 2019, which claims priority under 35 U.S.C. § 119(a) to Japanese Patent Application No. 2018-066739 filed on Mar. 30, 2018. Each of the above application(s) is hereby expressly incorporated by reference, in its entirety, into the present application.

BACKGROUND OF THE INVENTION

1. Field of the Invention

The present invention relates to an image layout size calculation apparatus, an image layout size calculation method, an image layout size calculation program, and a recording medium storing the program.

2. Description of the Related Art

In a photo album or the like, an image to be used in the album is selected from a large number of images and the selected image is laid out (JP2014-199641A). User assistance is provided in such a layout. An apparatus that determines the necessity of a plurality of image data (JP2013-143661A), an apparatus that changes the output size of the image in a case of outputting (JP2005-236808A), and an apparatus that converts the image size on the output image that actually appears (JP2003-250040A) have been also considered. Further, an apparatus that checks the input image and the output size and format thereof, and reduces the resolution and the number of pixels of the input image itself as necessary (JP2004-023322A), an apparatus that emphasizes blurriness of a subject other than a subject that is in focus in the refocused image (JP2016-024489A), and an apparatus that evaluates the blurriness state of the image (JP2015-156189A) have been also considered. Further, an apparatus that classifies and displays the thumbnail image according to the resolution to easily select the image suitable for a print size (JP2001-036843A).

SUMMARY OF THE INVENTION

In a case of image output such as printing or displaying of the image, in a case where an original image is too large compared to the expected output size, the output image may be blurred even though the original image is not blurred.

The object of the present invention is to be able to calculate a layout size such that an output image is not blurred.

An image layout size calculation apparatus according to an aspect of the present invention comprises a blurriness value decision unit that decides a blurriness value, which represents a blurriness degree, of equal to or smaller than a first threshold value among blurriness values for image areas, from one image, and a layout size calculation unit that calculates a layout size of the image in which the blurriness value is equal to or smaller than a second threshold value based on the blurriness value decided by the blurriness value decision unit, the number of pixels of the image, and resolution of an output apparatus of the image.

Another aspect of the present invention provides an image layout size calculation method. That is, the method comprises causing a blurriness value decision unit to decide a blurriness value, which represents a blurriness degree, of equal to or smaller than a first threshold value among blurriness values for image areas, from one image, and causing a layout size calculation unit to calculate a layout size of the image in which the blurriness value is equal to or smaller than a second threshold value based on the blurriness value decided by the blurriness value decision unit, the number of pixels of the image, and resolution of an output apparatus of the image.

Still another aspect of the present invention provides a computer-readable program that controls a computer of an image layout size calculation apparatus and a recording medium (portable recording medium) storing the program.

The image layout size calculation apparatus according to the aspect of the present invention may further comprise a processor, and the processor may decide a blurriness value, which represents a blurriness degree, of equal to or smaller than a first threshold value among blurriness values for image areas, from one image, and calculate a layout size of the image in which the blurriness value is equal to or smaller than a second threshold value based on the decided blurriness value, the number of pixels of the image, and resolution of an output apparatus of the image.

The image layout size calculation apparatus according to the aspect of the present invention may further comprise a sharpness emphasizing unit that emphasizes a sharpness of the image. In this case, the layout size calculation unit calculates the layout size of the image in which the blurriness value of the image is equal to or smaller than the second threshold value based on the blurriness value decided by the blurriness value decision unit, the number of pixels of the image, the resolution of the output apparatus of the image, and an emphasis degree of a sharpness by the sharpness emphasizing unit.

The image layout size calculation apparatus according to the aspect of the present invention may further comprise an output control unit that makes the image fit into a frame having a size equal to or smaller than the layout size calculated by the layout size calculation unit, and causes the output apparatus to output the image.

For example, the output control unit makes the image fit into the frame having the size equal to or smaller than the layout size calculated by the layout size calculation unit, sets the resolution of the image to be equal to or smaller than the resolution capable of being distinguished at an observation distance, and causes the output apparatus to output the image.

The image layout size calculation apparatus according to the aspect of the present invention may further comprise a frame designation unit that designates the frame for outputting the image, a warning unit that issues a warning in response to the size of the frame designated by the frame designation unit being larger than the layout size calculated by the layout size calculation unit, and an output command inputting unit that inputs an output command. In this case, the output control unit makes the image fit into the frame designated by the frame designation unit and causes the output apparatus to output the image, in response to the output command being input from the output command inputting unit after the warning unit issues a warning.

The image layout size calculation apparatus according to the aspect of the present invention may further comprise a threshold value inputting unit that inputs the second threshold value. In this case, the layout size calculation unit calculates the layout size in which the blurriness value is equal to or smaller than the second threshold value input by the threshold value inputting unit based on the blurriness value decided by the blurriness value decision unit and the resolution of the output apparatus of the image.

The image layout size calculation apparatus according to the aspect of the present invention may further comprise an image selecting unit that selects an image having an allowable blurriness degree among a plurality of sample images having different blurriness degrees. In this case, the threshold value inputting unit inputs the second threshold value corresponding to the image selected by the image selecting unit.

The blurriness value decision unit may decide a smallest blurriness value in the image from one image.

The layout size calculation unit calculates the layout size in which the blurriness of the image is eliminated, based on the blurriness value decided by the blurriness value decision unit, the number of pixels of the image, and the resolution of the output apparatus of the image.

In this case, the layout size calculation unit calculates a maximum layout size in which the blurriness value is equal to or smaller than the second threshold value based on the blurriness value decided by the blurriness value decision unit, the number of pixels of the image, and the resolution of the output apparatus of the image.

The image layout size calculation apparatus according to the aspect of the present invention may further comprise a blurriness value calculation unit that calculates a blurriness value representing a blurriness degree of an image area of a main subject in the image and a blurriness value representing a blurriness degree of an image area excluding the main subject, and an image processing unit that performs image processing that maintains a relationship between the blurriness value representing the blurriness degree of the image area of the main subject and the blurriness value representing the blurriness degree of the image area excluding the main subject which are calculated by the blurriness value calculation unit, with respect to the image fitted into the frame having the size equal to or smaller than the layout size calculated by the layout size calculation unit. In this case, the output control unit makes the image subjected to the image processing by the image processing unit fit into the frame having the size equal to or smaller than the layout size calculated by the layout size calculation unit, and causes the output apparatus to output the image.

According to the present invention, since the layout size of the image in which the blurriness value is equal to or smaller than the second threshold value can be calculated, the image having a low blurriness degree or no blurriness by outputting the image with the size equal to or smaller than the calculated layout size.

DESCRIPTION OF THE PREFERRED EMBODIMENTS

First Embodiment

Figure 1:
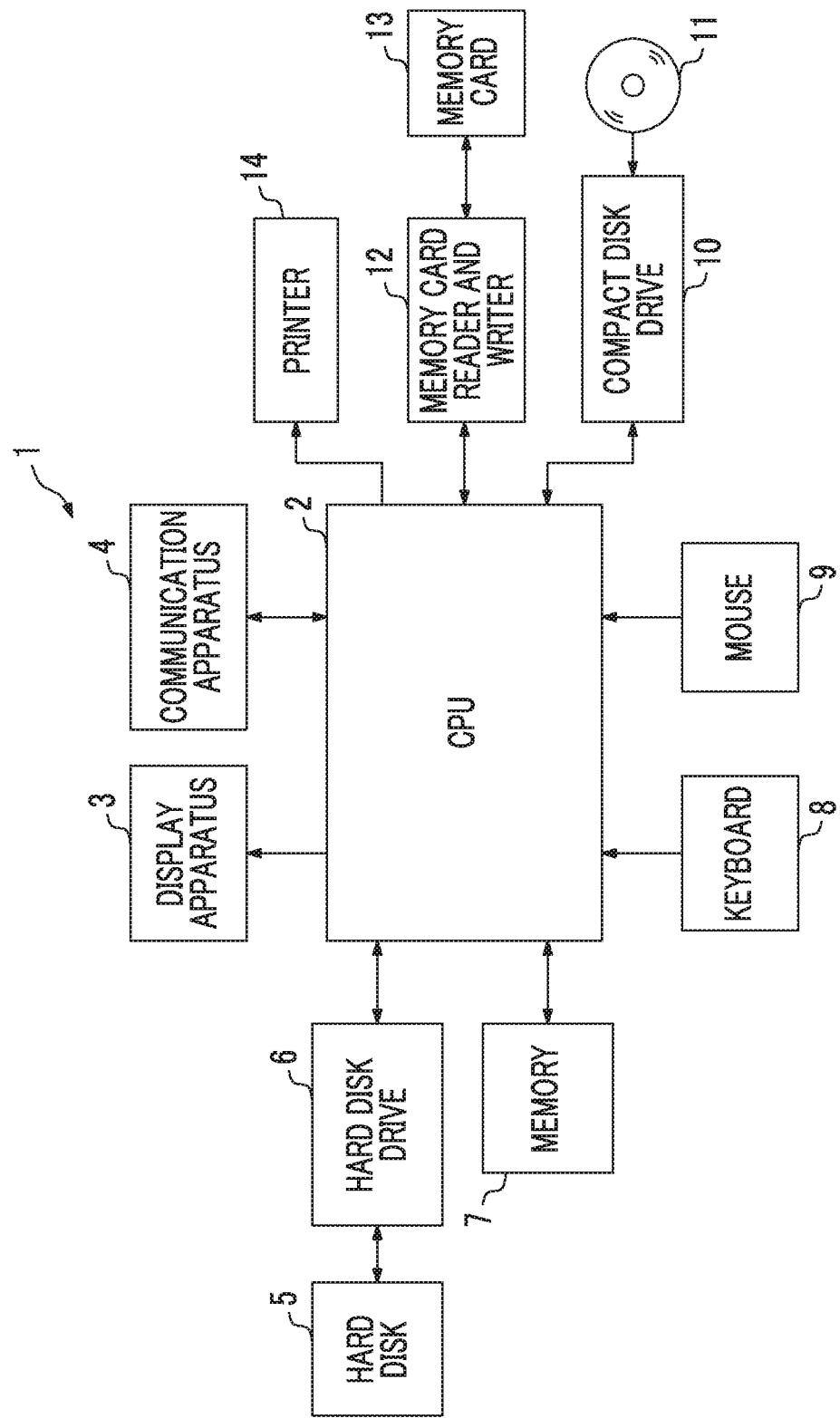
FIG. 1 is a block diagram showing an electric configuration of an image layout size calculation apparatus.

FIG. 1 shows an embodiment of the present invention and is a block diagram showing an electric configuration of an image layout size calculation apparatus 1.

The entire operation of the image layout size calculation apparatus 1 is controlled by a central processing unit (CPU) 2.

The image layout size calculation apparatus 1 includes a display apparatus 3 that displays an image and other information on a display screen and a communication apparatus 4 that is connected to the Internet and other network and communicates with apparatuses other than the image layout size calculation apparatus 1. Also, the image layout size calculation apparatus 1 includes a hard disk 5, a hard disk drive 6 for accessing the hard disk 5, a memory 7 that stores data, and a keyboard 8 and a mouse 9 for inputting commands. Furthermore, the image layout size calculation apparatus 1 includes a compact disk drive 10 for accessing a compact disk 11 and a memory card reader and writer 12 for performing data writing on a memory card 13 and reading the data recorded in the memory card 13. Furthermore, the image layout size calculation apparatus 1 includes a printer 14 that prints an image.

An operation program of the image layout size calculation apparatus 1 to be described below is received by the communication apparatus 4 via the Internet. The received operation program is installed in the image layout size calculation apparatus 1. The operation program may be recorded in a portable recording medium such as the compact disk 11 and read from the portable recording medium without being installed in the image layout size calculation apparatus 1 after being received by the image layout size calculation apparatus 1 via a network such as the Internet. In this case, the operation program read from the portable recording medium is installed in the image layout size calculation apparatus 1. It is needless to say that the operation program is capable of being read by a CPU 2 (computer) of the image layout size calculation apparatus 1.

Figure 2:
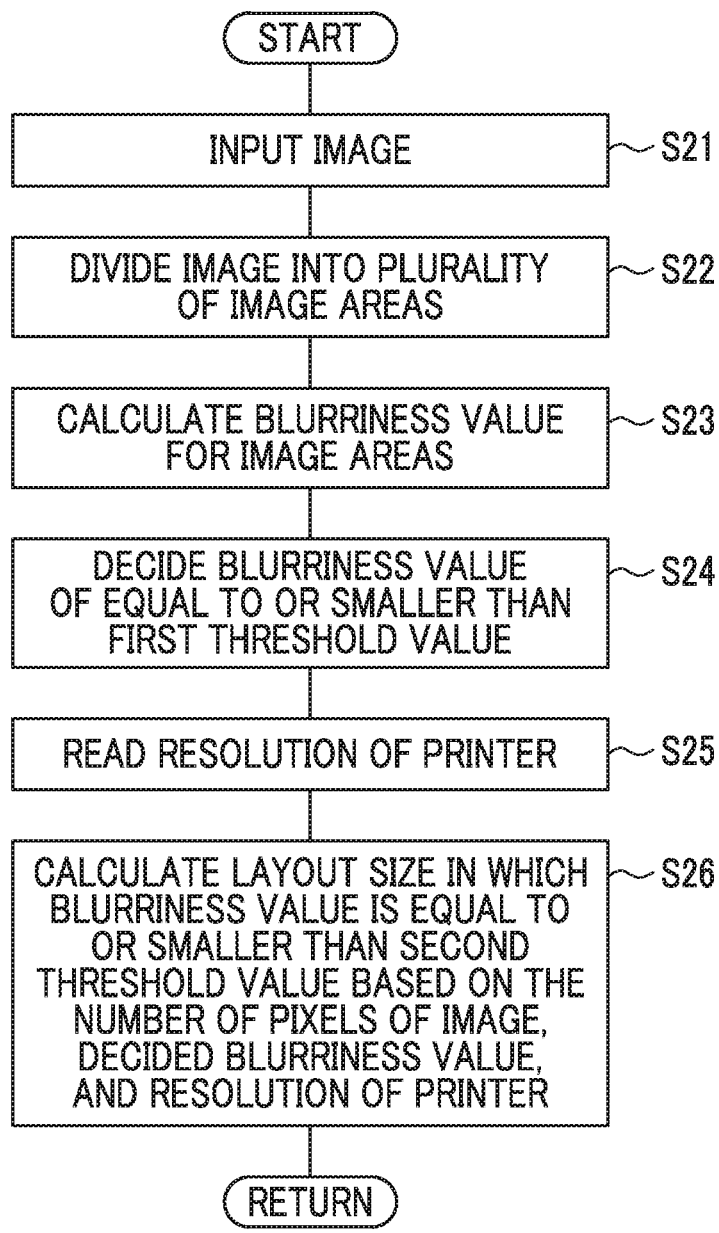
FIG. 2 is a flowchart showing a processing procedure of the image layout size calculation apparatus.

FIG. 2 is a flowchart showing a processing procedure of the image layout size calculation apparatus 1. The processing shown in FIG. 2 is executed by the CPU 2 of the image layout size calculation apparatus 1.

In the present embodiment, in a case where an image is output (displayed or printed), the layout size of the image is decided such that a blurriness value representing a blurriness degree is equal to or smaller than a predetermined threshold value (second threshold value described below). By enlarging and outputting the image, it is possible to prevent the blurriness from be conspicuous.

Figure 3:
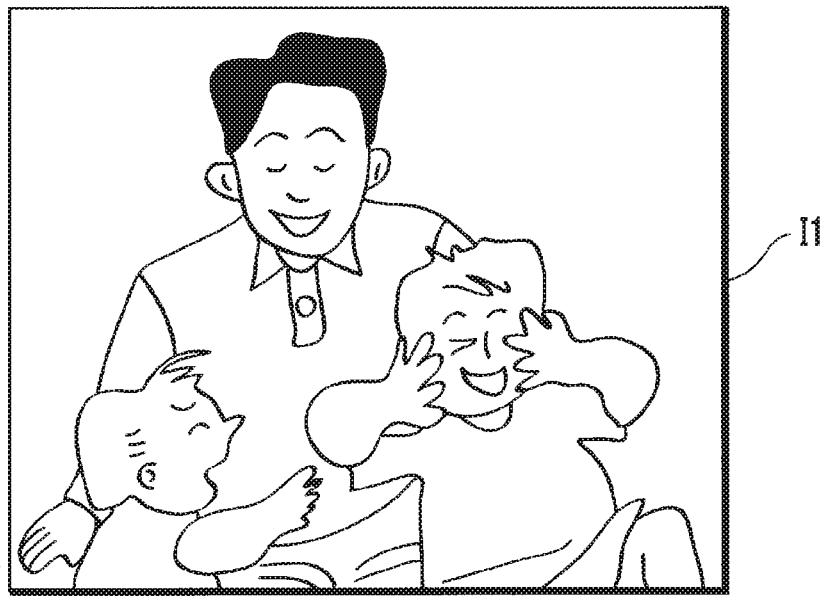
FIG. 3 is an example of an image.

Desired image data of image data, representing the image, stored in the memory card 13 is read from and input to the CPU 2 (step S21). FIG. 3 is an example of an image I1 represented by the input image data.

In a case where the image data is read, the image I1 represented by the read image data is divided into a plurality of image areas by the CPU 2 (step S22).

Figure 4:
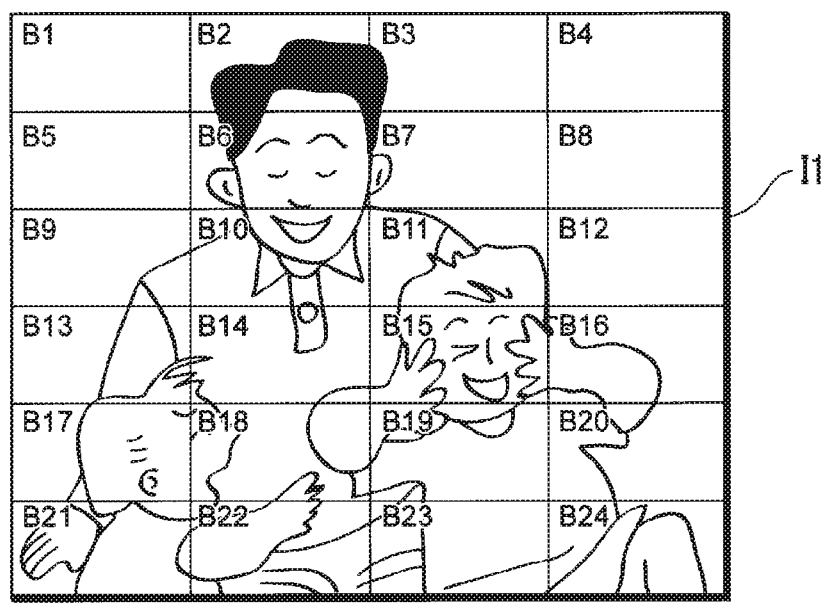
FIG. 4 is an example of an image divided into a plurality of image areas.

FIG. 4 is an example in which the image I1 is divided.

With reference to FIG. 4, the image I1 is divided into a total of 24 image areas B1 to B24, four in a width direction and six in a height direction. The image I1 does not necessarily have to be divided into 24 image areas B1 to B24. The image I1 need only be divided into a plurality of image areas. However, it is not necessary to divide the image I1 into a plurality of image areas because it is sufficient to know the image areas of equal to or smaller than a first threshold value as described below.

Returning to FIG. 2, in a case where the image I1 is divided into a plurality of image areas B1 to B24, the CPU 2 calculates the blurriness value for each image area of the divided image areas B1 to B24 (step S23). The blurriness value represents a blurriness degree of the image, and is a degree of change in the shade of the boundary between the subjects included in the image. The smaller the degree of change in shade of the boundary of the subject included in the image, the larger the blurriness degree of the image area, and the larger the blurriness value. An edge strength is detected for the image areas and the blurriness value is known from the edge strength (the larger the edge strength value, the smaller the blurriness value, and the smaller the edge strength value, the larger the blurriness value, for example, the blurriness value need only be the reciprocal of the edge strength value). The edge strength can be calculated by obtaining how many inches the pixel of interest is to be moved to cause a predetermined amount of brightness change (in a case of being recorded in 256 levels of 0 to 255 (8 bits), for example, 50 levels, and in a color image consisting of 3 channels of red (R), green (G), and blue (B), it may be the largest change in brightness changes thereof) in the image area (it may be calculated in pixel units and divided by the output resolution, or image data may be calculated in inches from the beginning).

The CPU 2 (blurriness value decision unit) decides the blurriness value of equal to or smaller than the first threshold value among the blurriness values calculated for the image areas of the divided image areas B1 to B24 (step S24). The first threshold value may be decided in advance, or input by a user. For example, the smallest blurriness value among the blurriness values calculated for the image areas of the divided image areas B1 to B24 may be the first threshold value. In a case where a plurality of the blurriness values equal to or smaller than the first threshold value are present, the smallest blurriness value may be decided, but another blurriness value equal to or smaller than the first threshold value may be decided. In a case where there is no blurriness value equal to or smaller than the first threshold value, the first threshold value may be increased repeatedly until the blurriness value equal to or smaller than the first threshold value is found, or the user may be notified that the image is too blurred.

Data representing the resolution of the printer 14 that prints the image I1 is read from the printer 14 (step S25). In a case where the image I1 is printed by a different printer from the printer 14 included in the image layout size calculation apparatus 1, data representing the resolution of the printer that prints the image I1 is input to the CPU 2.

In a case where the image I1 is printed by the printer 14, the image layout size in which the blurriness value is equal to or smaller than the second threshold value is decided by the CPU 2 (layout size decision unit) based on the number of pixels of the image I1, the decided blurriness value, and the resolution of the printer (step S26). For example, it is assumed that the printer 14 prints the image I1, the number of pixels of the image I1 in a width direction (horizontal direction) is Px pixels, the number of pixels in a height direction (vertical direction) is Py pixels, the resolution of the printer 14 is n [dpi] (dots per inch), the decided blurriness value is V1, and the second threshold value is V2.

In a case where the decided blurriness value V1 is equal to or smaller than the second threshold value V2, the image I1 need only be printed without reducing the size of the image I1 decided based on the number of pixels of the image I1 and the resolution of the printer 14. Therefore, the layout size of the image I1 in the width direction is represented by Px/n [dpi], and the layout size of the image I1 in the height direction is represented by Py/n [dpi]. For example, it is assumed that the printer 14 prints the image I1, the number of pixels of the image I1 in the width direction (horizontal direction) is 2560 pixels, the number of pixels in the height direction (vertical direction) is 1920 pixels, the total pixel is about 5 million pixels, and the resolution of the printer 14 is 300 dpi (dots per inch). The image layout size in which the blurriness value of the image to be printed is equal to or smaller than the second threshold value V2 is Px/n [dpi] =2560 pixels/300 [dpi]=8.5 [inch] in the width direction, and Py/n [dpi]=1920 pixels/300 [dpi]=6.4 [inch] in the height direction.

In a case where the decided blurriness value V1 is larger than the second threshold value V2, even in a case where the image I1 is printed without reducing the size of the image I1 decided based on the number of pixels of the image I1 and the resolution of the printer 14, the blurriness value of the printed image is not different from the decided blurriness value V1, and thus the blurriness value of the printed image may be larger than the second threshold value V2. Therefore, the image I1 is printed by reducing the size of the image I1 decided based on the number of pixels of the image I1 and the resolution of the printer 14 according to the ratio between the decided blurriness value V1 and the second threshold value V2.

Figure 5:
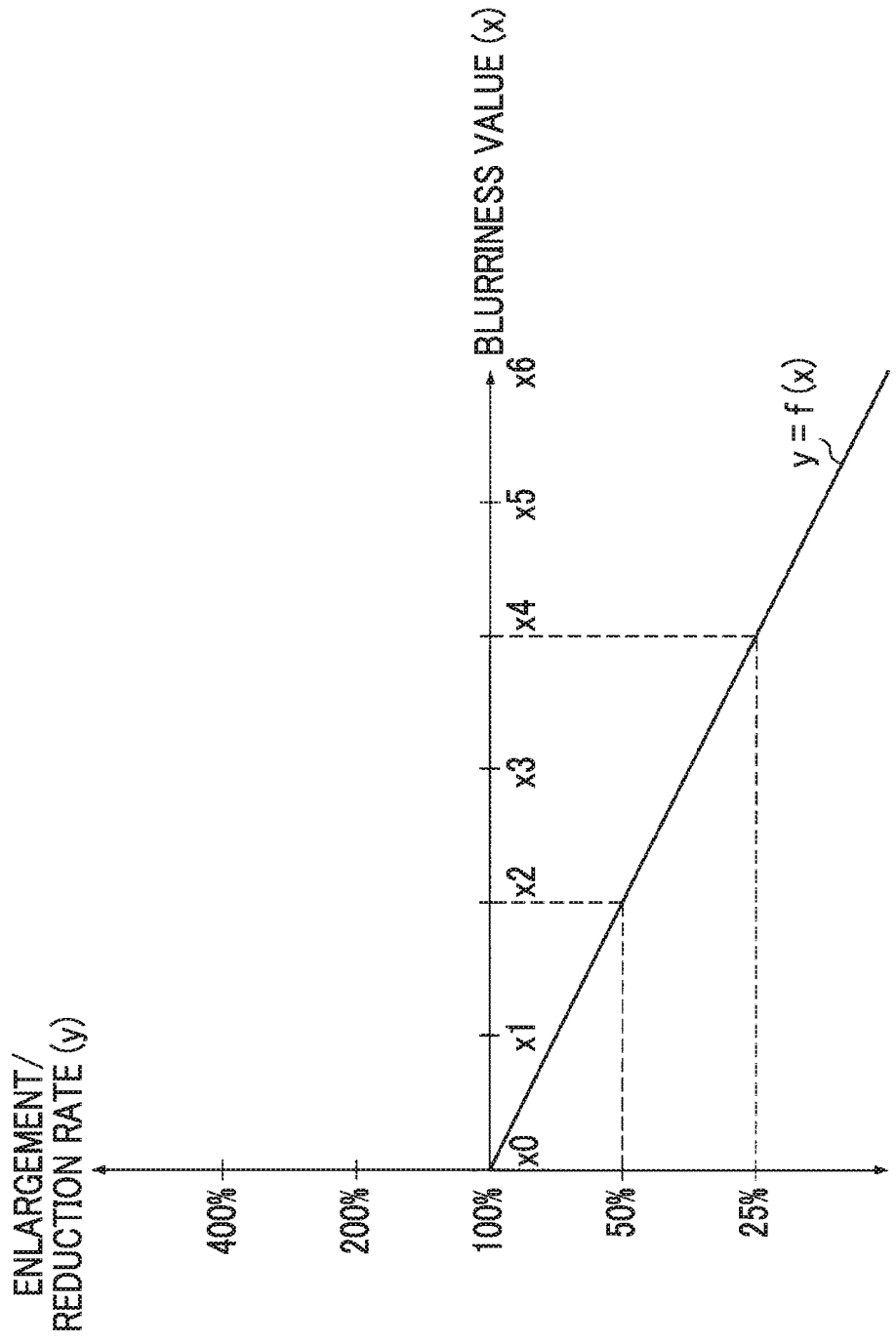
FIG. 5 shows a relationship between a blurriness value and an enlargement/reduction rate.

FIG. 5 shows a relationship between the blurriness value and an enlargement/reduction rate of the image (an enlargement rate and a reduction rate). In FIG. 5, the lateral axis represents the blurriness value, and the vertical axis represents the enlargement/reduction rate.

The graph $y=f(x)$ shows that in a case where the blurriness value of the image in a case where the enlargement/reduction rate is 100% (the enlargement/reduction rate of 100% means neither enlarging nor reducing) is x0, how much reduction rate is required to make the blurriness value of the image after reduction be x0 in a case where the blurriness value of the same image is larger than x0. The graph y=f(x) can be decided by actually enlarging or reducing a large number of images having different blurriness value. In FIG. 5, there is a relationship of the blurriness values x0<x1<x2<x3<x4<x5<x6. For example, in a case where the blurriness value is x2, the blurriness value of the image after reduction is x0 in a case of the reduction rate of 50%, and in a case where the blurriness value is x4, the blurriness value of the image after reduction is x0 in a case of the reduction rate of 25%. The reduction rate (or the enlargement rate) refers to the reduction rate (or the enlargement rate) of the length of one side of the image. It should be noted that x0 to x6 are merely values provided for the purpose of explanation, and the blurriness value does not need to be a discrete value, and may be a discrete value or a continuous value.

For example, in a case where the decided blurriness value V1 corresponds to x2 and the second threshold value V2 corresponds to x0, in a case where the size of the image I1 decided based on the number of pixels of the image I1 and the resolution of the printer 14 is reduced by the reduction rate of 50%, the blurriness value of the image after reduction becomes equal to or smaller than the second threshold value V2. For example, it is assumed that the printer 14 prints the image I1, the number of pixels of the image I1 in the width direction (horizontal direction) is 2560 pixels, the number of pixels in the height direction (vertical direction) is 1920 pixels, the total pixel is about 5 million pixels, and the resolution of the printer 14 is 300 dpi (dots per inch). The size of the image printed with the enlargement/reduction rate of 100% is Px/n [dpi]=2560 pixels/300 [dpi]=8.5 [inch] in the width direction, and Py/n [dpi]=1920 pixels/300 [dpi] =6.4 [inch] in the height direction. In a case where the image of such a size is reduced by the reduction rate of 50%, the blurriness value of the reduced image becomes equal to or smaller than the second threshold value V2. The layout size of the image after reduction is 8.5 [inch]×½=4.25 [inch] in the width direction and 6.4 [inch]×½=3.2 [inch] in the height direction.

In a case where the image is printed by the printer 14 with a size equal to or smaller than the decided layout size, the blurriness value of the printed image becomes equal to or smaller than the second threshold value V2. However, instead of calculating the layout size of the image to be equal to or smaller than the second threshold value V2, the layout size of the image in which the blurriness is eliminated may be calculated. The second threshold value V2 need only be set to a value in which the blurriness of the image is eliminated.

The maximum layout size may be calculated among the layout sizes which are equal to or smaller than the second threshold value V2, or the layout size smaller than the maximum layout size may be calculated instead of the maximum layout size. As described above, it is necessary to compare the decided blurriness value V1 and the second threshold value V2 as values to be output with the same resolution. The same resolution is, for example, the resolution of the printer to output, but it is not always necessary to calculate the blurriness value based on the resolution of the printer itself during the calculation processing. For example, in a case where 96 dpi is recorded as the recommended output resolution in the exchangeable image file format (Exif) region of the image I1, the blurriness value V1 at 300 dpi may be calculated directly while ignoring the recording at 96 dpi, however, the blurriness value at 96 dpi may be calculated, be converted to the blurriness value V1 at 300 dpi (the blurriness value at 96 dpi may be multiplied by 300/96), and be compared with the second threshold value V2.

Figure 6:
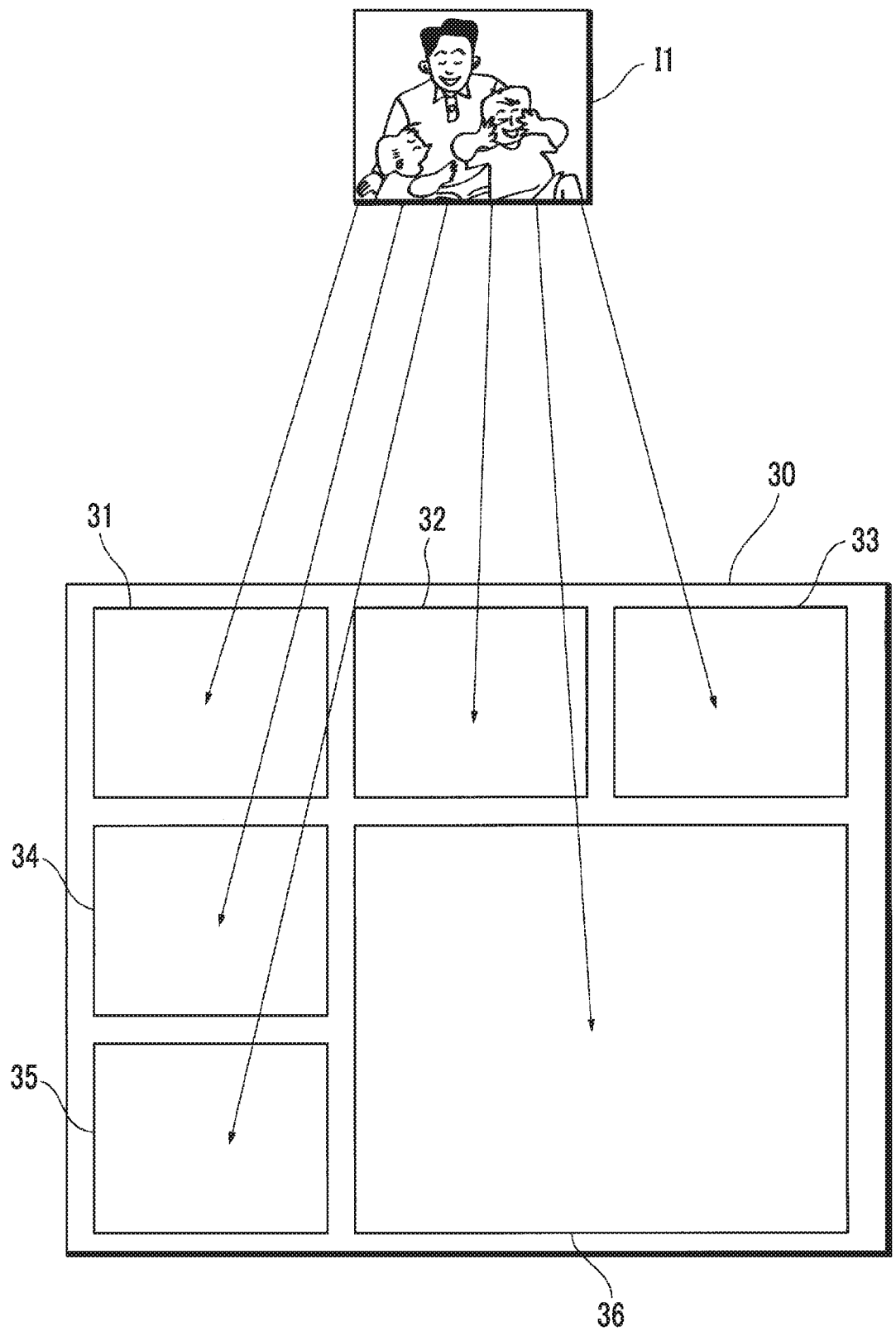
FIG. 6 shows an appearance in which the image is inserted in an image insertion frame.

FIG. 6 shows an appearance in which the image I1 is disposed.

A page 30 that configures the photo album is shown. The page 30 defines image insertion frames 31 to 36. The image is enlarged or reduced, and inserted by the CPU 2 (an example of an output control unit) into the image insertion frame of equal to or smaller than the layout size calculated as above among the image insertion frames 31 to 36. For example, in a case where the size of the image insertion frame 36 is larger than the calculated layout size, the image I1 is not inserted into the image insertion frame 36. In a case where the image I1 is enlarged and inserted so as to fit into the image insertion frame 36, the blurriness value of the image after insertion becomes larger than the second threshold value V2. In a case where any of the image insertion frames 31 to 35 has a size equal to or smaller than the calculated layout size, the image I1 is fitted in any of the image insertion frames 31 to 35. The blurriness value of the image I1 is equal to or smaller than the second threshold value V2.

According to the present embodiment, in a case where the image is output by the printer 14, the blurriness value of the image can be suppressed to equal to or smaller than the second threshold value V2.

Other Embodiment

Figure 7:
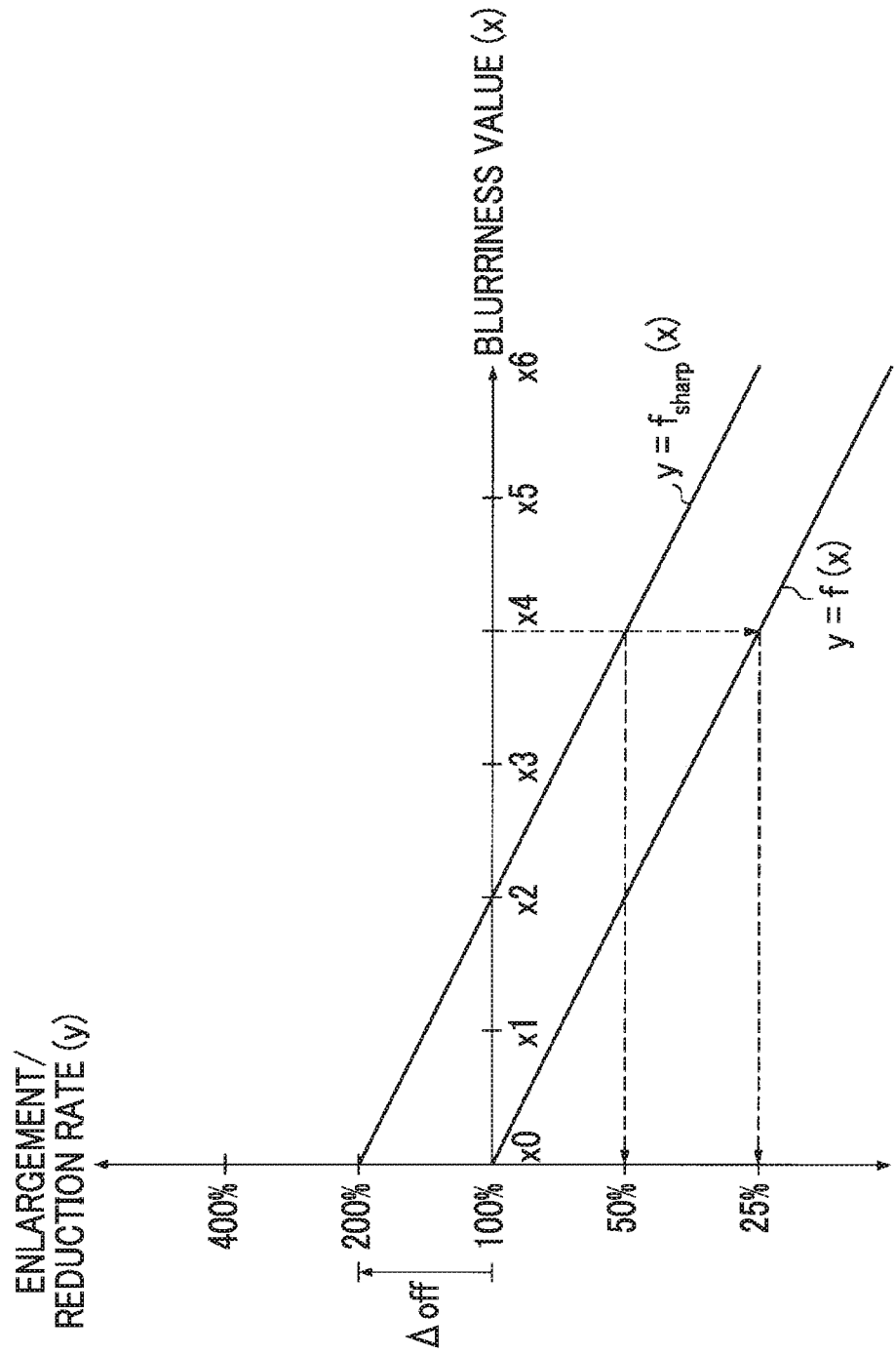
FIG. 7 shows a relationship between the blurriness value and the enlargement/reduction rate.

FIG. 7 corresponds to FIG. 5, and shows a relationship between the blurriness value in a case where the image is subjected to sharpness processing (edge emphasis processing) and the enlargement/reduction rate (enlargement rate and reduction rate) of the image. In FIG. 7, the lateral axis represents the blurriness value, and the vertical axis represents the enlargement/reduction rate.

The graph y=fsharp(x) shows that in a case where the blurriness value and the enlargement/reduction rate of the graph y=f(x) are related to each other, the offset Δoff is generated and the enlargement/reduction rate is changed by performing the sharpness processing. Similarly to the graph y=f(x), the graph y=fsharp(x) can be obtained by actually performing enlarging or reducing and the sharpness processing on a large number of images having different blurriness values.

For example, in a case where the blurriness value of the image is x0 in a case of the enlargement/reduction rate of 100%, even in a case where the enlargement/reduction rate is 200% by performing the sharpness processing, the blurriness value of the image is not changed from x0. Also, as described above, in a case where the sharpness processing is not performed, for example, in a case where the blurriness value is x2 and the enlargement/reduction rate is equal to or smaller than 50%, the blurriness value of the image after reduction is x0, however, in a case where the sharpness processing is performed, the blurriness value is x0 in a state where the enlargement/reduction rate is 100%. In a case where sharpness processing is not performed, in a case where the blurriness value is x4, the blurriness value cannot be maintained at x0 unless the blurriness value is reduced by an enlargement/reduction rate of equal to or smaller than 25%, however, in a case where the sharpness processing is performed, the blurriness value can be maintained at x0 only by performing reduction by the enlargement/reduction rate of equal to or smaller than 50%.

By performing sharpness processing on the image, the blurriness degree can be maintained without reducing the layout size of the image. The sharpness processing is performed by the CPU 2 (sharpness emphasizing unit), but may be performed by using a dedicated device or the like.

Figure 8:
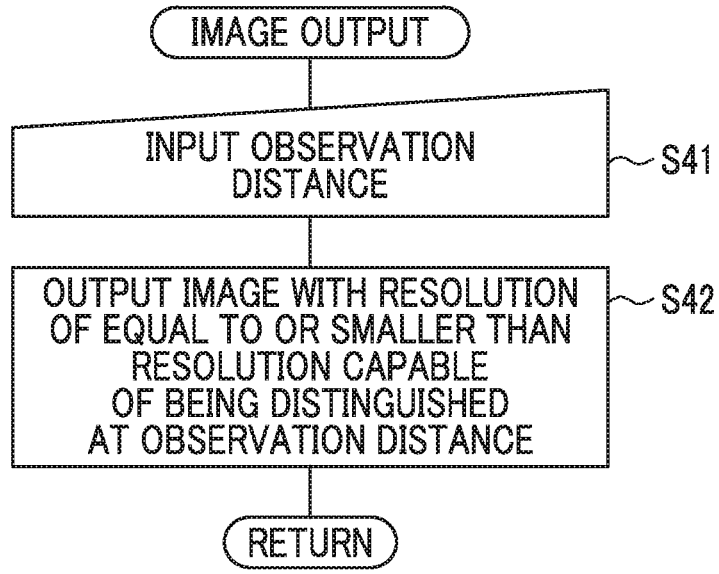
FIG. 8 is a flowchart showing an image output processing procedure.

FIG. 8 is a flowchart showing an image output processing procedure. The processing procedure is performed by the CPU 2 of the image layout size calculation apparatus 1.

The observation distance is input by the keyboard 8 or the like (step S41). The observation distance is a distance to the image from (eyes of) the user who views the image in a case of viewing the image. For example, in the case of a photo album, the observation distance is about 30 cm. In a case where an image is attached to the wall surface of the building by a poster or the like, the observation distance is about 10 m. The observation distance is determined according to the medium on which the image to be viewed is printed and the place where the medium is placed.

In a case where the observation distance is input, the image is output under the control of the CPU 2 (output control unit) by the resolution of equal to or smaller than the resolution capable of being distinguished at the observation distance (step S42). The resolution capable of being distinguished at the observation distance is obtained as follows. In a case where 1 [cycle] of a sine wave is represented by two pixels of white and black, the maximum sensitivity is obtained from 2 to 6 [cycle/deg], and the number of pixels per one visual angle is from 4 to 12 [pixel/deg]. In a case of the prints such as the photo album, the observation distance is about 30 [cm], and the width at the observation distance of 30 [cm] at one visual angle is 0.3 sin 1°=0.5 [mm], and thus the maximum sensitivity is maximized in a case of 4 [pixel] to 12 [pixel] per 0.5 [mm]. Therefore, the resolution at the observation distance of 30 [cm] is approximately 203 [dpi] to 610 [dpi]. In a case where the image is attached to the wall surface of the building, in a case where the observation distance is 10 [m], the width at the observation distance of 10 [cm] is 10 sin 1°=17 [cm], and thus the maximum sensitivity is maximized in a case of 4 [pixel] to 12 [pixel] per 17 [cm]. The resolution at the observation distance of 10 [m] is approximately 3 [dpi] to 18 [dpi].

Figure 9:
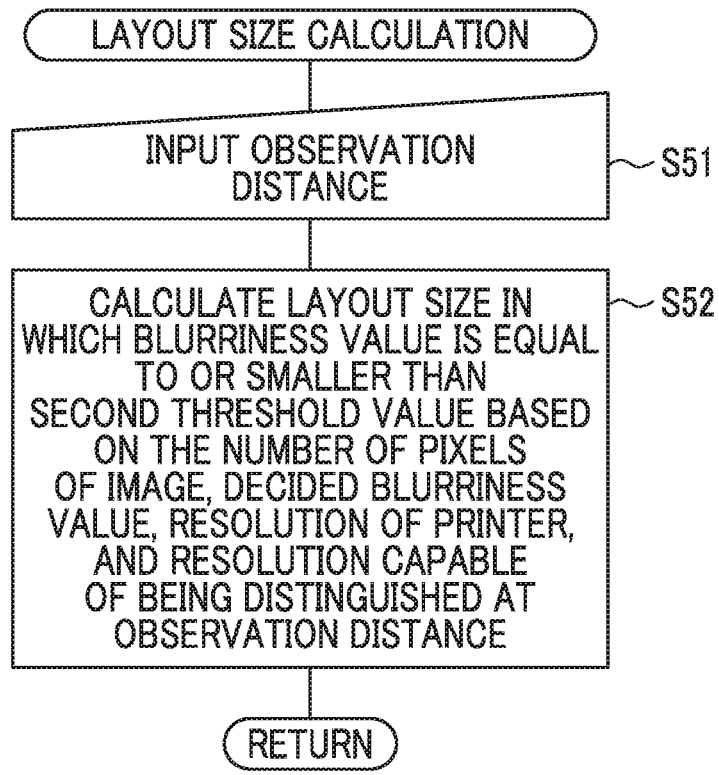
FIG. 9 is a flowchart showing a layout size calculation processing procedure.

FIG. 9 is a flowchart showing a layout size calculation processing procedure (processing procedure of step S26 shown in FIG. 2).

The observation distance is input in the same manner as described above (step S51). The CPU 2 calculates the layout size in which the blurriness value is equal to or smaller than the second threshold value V2 based on the number of pixels of the image, the decided blurriness value V1, and the resolution of the printer 14 (which is, in a case where the image is output from the output apparatus other than the printer, the resolution of the output apparatus), and the resolution (ne) capable of being distinguished at the observation distance (step S52).

In a case where the resolution ne capable of being distinguished at the observation distance is higher than the resolution n of the printer 14, the resolution n of the printer 14 is used. The layout size of the image I1 in the width direction is represented by Px/n [dpi], and the layout size of the image I1 in the height direction is represented by Py/n [dpi]. On the contrary, the resolution ne capable of being distinguished at the observation distance is lower than the resolution n of the printer 14, the resolution ne capable of being distinguished at the observation distance is used. The layout size of the image I1 in the width direction is represented by Px/ne [dpi], and the layout size of the image I1 in the height direction is represented by Py/ne [dpi].

As described above, in a case where the decided blurriness value V1 is equal to or smaller than the second threshold value V2, the image I1 need only be printed without reducing the size of the image decided based on the number of pixels of the image I1 and the resolution n of the printer 14 or the resolution ne capable of being distinguished at the observation distance. In a case where the decided blurriness value V1 is larger than the second threshold value V2, the image need only be printed by reducing the size.

The image can be output with the resolution capable of being distinguished by the user.

Figure 10:
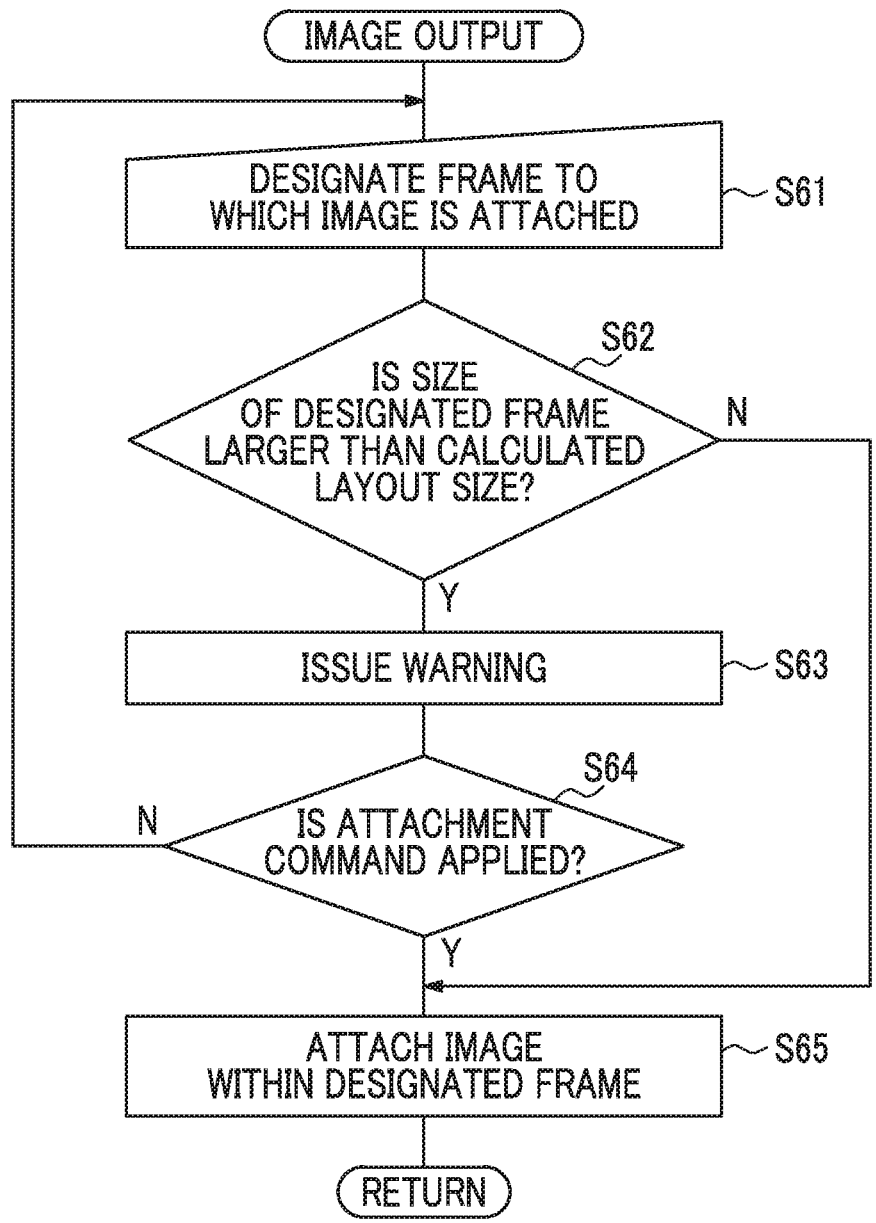
FIG. 10 is a flowchart showing an image output processing procedure.

FIG. 10 is a flowchart showing an image output processing procedure. The processing procedure is performed by the CPU 2 of the image layout size calculation apparatus 1.

In the present embodiment, the frame for inserting the image is designated by the user. As shown in FIG. 6, the page 30 is displayed on the display screen of the display apparatus 3, and the user designates the image insertion frame for inserting the image I among the image insertion frames 31 to 36 included in the page 30 (step S61). For example, the image insertion frame for inserting the image I is designated by dragging the image I by using the mouse 9 (an example of a frame designation unit) to any insertion frame among the image insertion frames 31 to 36.

In a case where the size of the designated image insertion frame is larger than the calculated layout size (YES in step S62), in a case where the image I is enlarged so as to be fit into the designated image insertion frame, the blurriness value of the image I after being inserted into the image insertion frame exceeds the second threshold value V2 in a case where the image is printed by the printer 14. Therefore, the CPU 2 (warning unit) issues a warning to the user (step S63). For example, a message such as "image blurriness may be conspicuous" may be displayed on the display screen. In a case where a decision button displayed on the display screen of the display apparatus 3 is pressed by the mouse 9 (output command inputting unit), an attachment command (output command) is given to the CPU 2 (YES in step S64), the image I is attached to the designated image insertion frame and printed by the printer 14. In a case where a cancel button displayed on the display screen of the display apparatus 3 is pressed, a cancel command is given to the CPU 2 (NO in step S64), and another image insertion frame is designated by the user (step S61).

In a case where the size of the designated image insertion frame is equal to or smaller than the calculated layout size (NO in step S62), even in a case where the image I is attached to the designated image insertion frame, the blurriness value of the image after being attached does not exceed the second threshold value V2 even in a case of being printed by the printer 14. Therefore, the processing of step S63 and the processing of step S64 are skipped, and the image I is attached to the designated image insertion frame (step S65).

Even in a case where the image is blurred, the image can be attached to the image insertion frame designated by the user with the user's approval.

Figure 11:
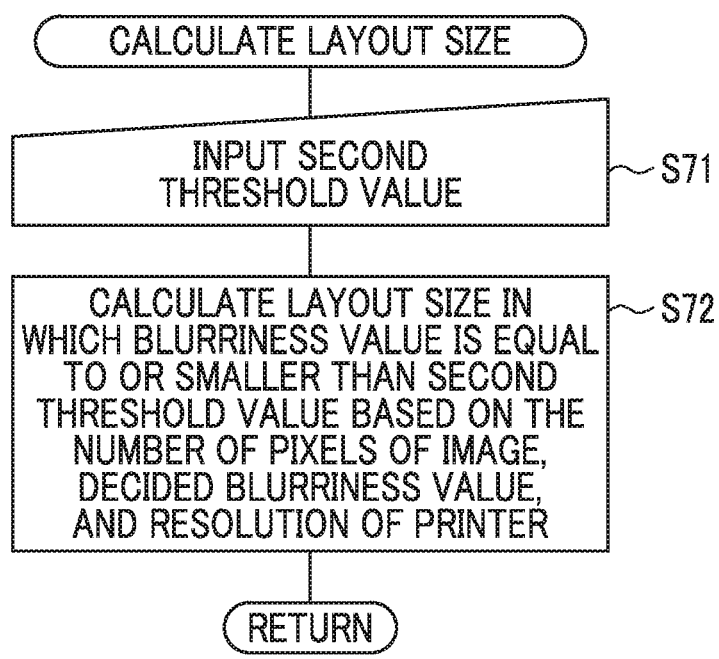
FIG. 11 is a flowchart showing the layout size calculation processing procedure.

FIG. 11 is a flowchart showing the layout size calculation processing procedure (processing procedure of step S26 shown in FIG. 2).

In the present embodiment, the user can set the second threshold value V2.

The user inputs the second threshold value V2 by using the keyboard 8 (an example of a threshold value inputting unit) (step S71). As described above, the CPU 2 calculates the layout size in which the blurriness value is equal to or smaller than the input second threshold value V2 based on the number of pixels of the image for which the layout size is calculated, the decided blurriness value V1 of the image for which the layout size is calculated, and the resolution of the printer 14 (step S72).

It is possible to calculate the layout size in which the image has the blurriness value of equal to or smaller than the blurriness value desired by the user (second threshold value V2).

Figure 12:
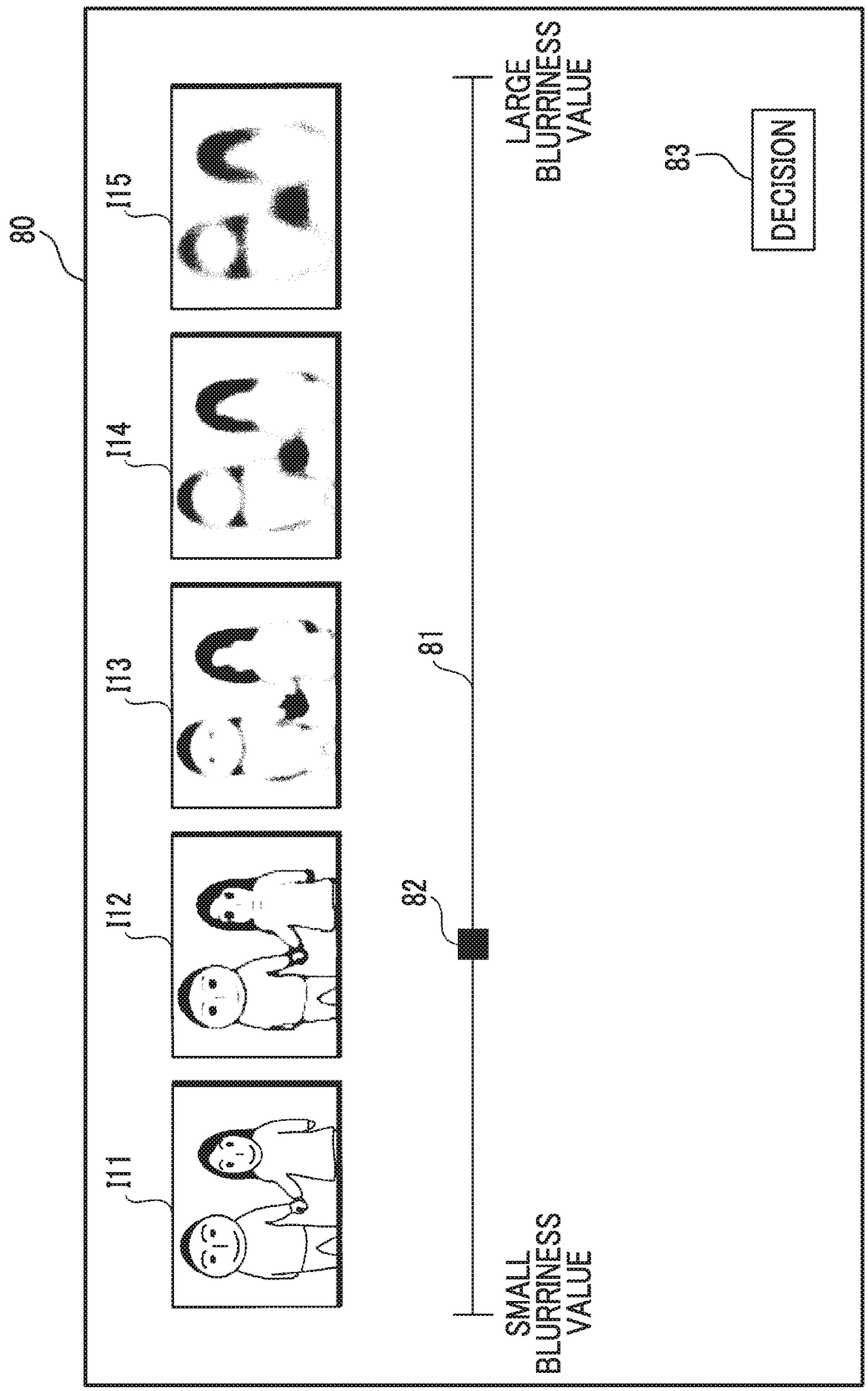
FIG. 12 is an example of a blurriness value setting window.

FIG. 12 is an example of a blurriness value setting window displayed on the display screen of the display apparatus 3.

A blurriness value setting window 80 is used to input the second threshold value V2 as described with reference to FIG. 11.

In the blurriness value setting window 80, a plurality of sample images I11 to I15 are arranged in one row in the horizontal direction (not necessarily one row in the horizontal direction). A slide bar 81 is formed below a plurality of sample images I11 to I15. On the slide bar 81, a slider 82 that is movable in the horizontal direction according to an instruction from the user is formed. The slider 82 can be moved horizontally using the mouse 9. The value of the second threshold value V2 is decided according to the position of the slider 82. The blurriness value represented by the second threshold value V2 becomes smaller as the slider 82 is positioned on the left side (the blurriness degree is small), and the blurriness value represented by the second threshold value V2 becomes larger as the slider 82 is positioned on the right side (the blurriness degree is large).

The image having the blurriness value according to the position where the slider 82 is positioned is displayed in the sample images I11 to I15. For example, the sample image I11 is an image corresponding to the blurriness value in a case where the slider 82 is positioned below the sample image I11. Similarly, other sample images I12, I13, I14, and I15 are images corresponding to the blurriness value in a case where the slider 82 is positioned at the position of each image. By viewing the sample images I11 to I15, it is possible to know what blurriness degree is allowable, and the user can input the second threshold value V2 with reference to the sample images I11 to I15. By pressing the decision button 83, the blurriness value according to the position of the slider 82 is decided.

Without using the slide bar 81 and the slider 82, any image among the sample images I11 to I15 may be selected by the mouse 9 (an example of an image selecting unit), and the blurriness value corresponding to the selected image may be input as the second threshold value V2. Also, in FIG. 12, the slider 82 (image selecting unit) can select the image. In order to grasp the difference in the blurriness degrees of the images, it is preferable that the subjects in the sample images I11 to I15 be the same.

In a case where the second threshold value V2 is input, in a case where the album is created using a plurality of images input by the user, the number of images to be used in the album depends on the second threshold value V2. For example, in a case where the second threshold value V2 of a small blurriness value is input, the image in which the blurriness is equal to or larger than the second threshold value is excluded from the album creation, the number of images that can be used in the album decreases. On the other hand, the second threshold value V2 of a large blurriness value is input, the number of images that can be used in the album increases. Therefore, the number of images that can be used in the album may be calculated according to the input second threshold value, and the user may notify the number thereof. Further, the user may be notified that the number of images that can be used changes depending on the second threshold value V2 without notifying the number of images that can be used.

Figure 13:
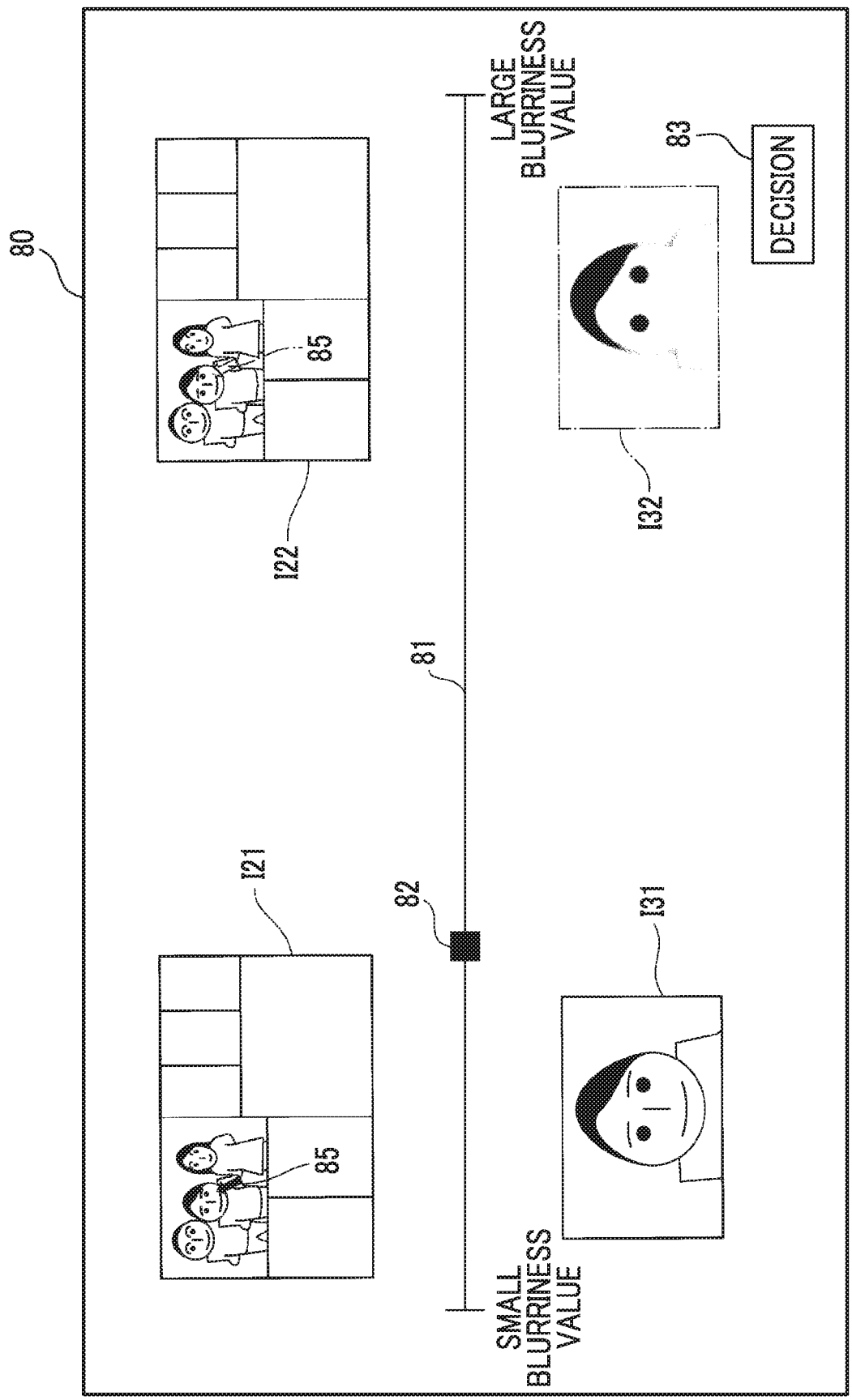
FIG. 13 is an example of the blurriness value setting window.

FIG. 13 is an example of the blurriness value setting window 80 displayed on the display screen of the display apparatus 3. In FIG. 13, the same components as those in FIG. 12 are denoted by the same reference numerals and description thereof is be omitted.

On the upper part of the slide bar 81, spread page images I21 and I22 configuring the album are displayed. The spread page images I21 and I22 are generated by using images having the blurriness value equal to or smaller than the second threshold value V2 of a plurality of predetermined stages (which may be set by the user) (for example, five stages). The spread page images are generated by the number corresponding to the number of stages in which the second threshold value V2 is set, but only two images I21 and I22 are shown in FIG. 13. For example, in a case where the album is generated by using the second threshold value V2 of five stages, five spread page images are displayed.

In a case where a desired image area in the spread page image I21 or I22 is designated and clicked by the cursor 85, an enlarged image I31 or I32 of the designated image area is displayed. The enlarged image I31 or I32 represents an actual blurriness degree in a case where the spread page image I21 or I22 is printed. The user views the enlarged image I31 or I32 and recognizes the actual blurriness degree in a case where the spread page image I21 or I22 is printed, and thus the user sets the second threshold value V2 using the slider 82 such that the blurriness is allowable. Therefore, the album can be created by allowing slight blurriness, adopting images with good composition or images with a specific subject in the album, or giving priority to images that are not blurred.

Figure 14:
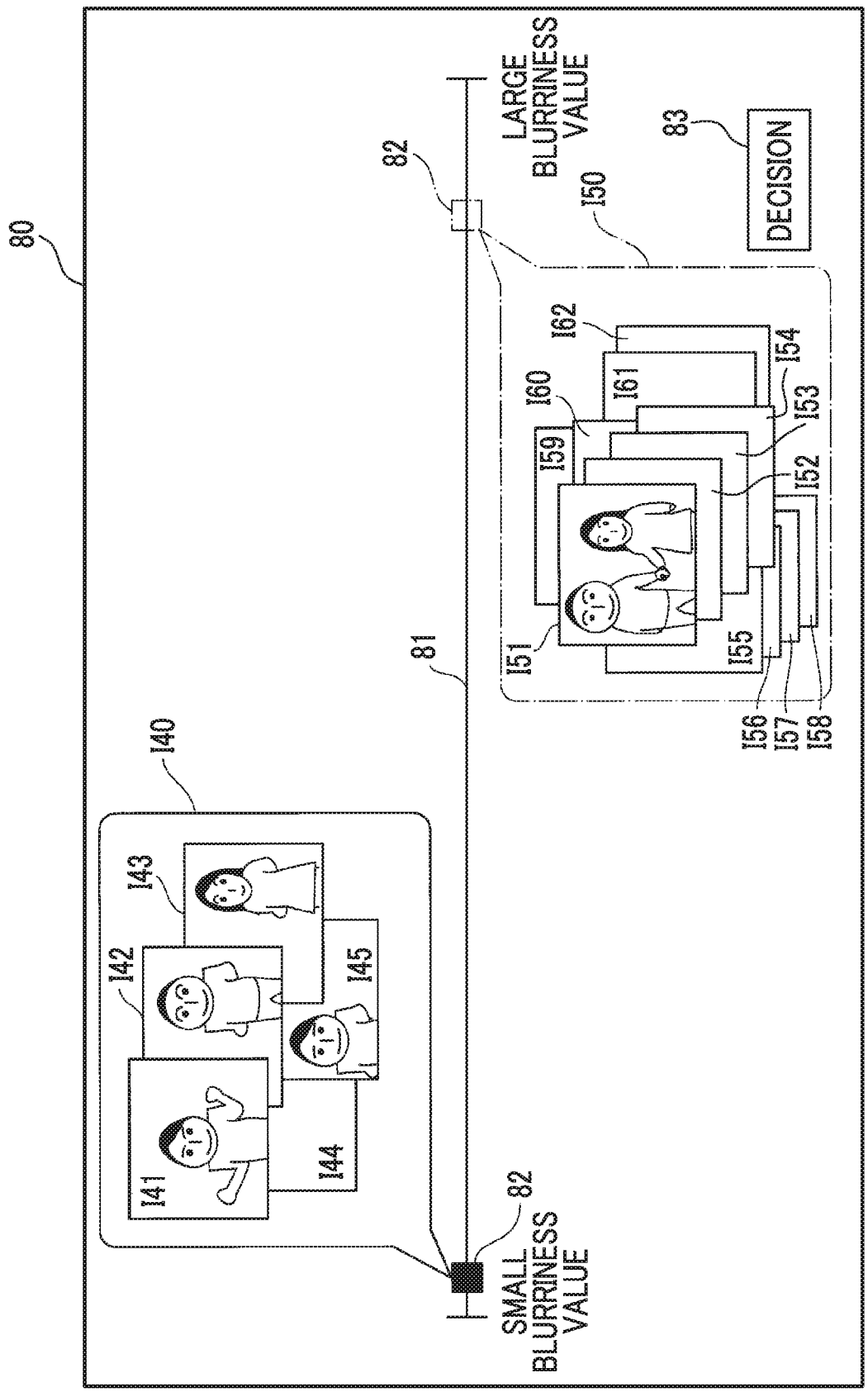
FIG. 14 is an example of the blurriness value setting window.

FIG. 14 is an example of the blurriness value setting window 80 displayed on the display screen of the display apparatus 3. In FIG. 14, the same components as those in FIG. 12 are denoted by the same reference numerals and description thereof is be omitted.

Image display areas I40 and I50 are displayed according to the position of the slider 82. In a case where the slider 82 is positioned on the left end part of the slide bar 81, the image display area I40 is displayed, and in a case where the slider 82 is positioned on the right end part of the slide bar 81, the image display area I50 is displayed. Even in a case where the slider 82 is positioned at a position other than the left end part or the right end part of the slide bar 81, the image display area corresponding to the position is displayed. The number of images corresponding to the position of the slider 82 is displayed in the image display area. The image displayed in the image display area shows the number (or relative amount) of image having the blurriness value of equal to or smaller than the second threshold value V2 input depending on the position on the slider 82. The number of images displayed in the image display area decreases as the slider 82 approaches the left end part, and the number of images displayed in the image display area increases as the slider 82 approaches the right end part.

Images I41 to I45 are displayed in the image display area I40, and images I51 to I62 are displayed in the image display area I50. The image display areas I40 and I50 indicate the amount of the image having the blurriness value equal to or smaller than the second threshold value V2 designated depending on the position of the slider 82 among the plurality of images input by the user. For example, in a case where the slider 82 is positioned near the left end and the second threshold value V2 is input, since the number of images having the blurriness value equal to or smaller than the second threshold value V2 is small, and a small amount of images I41 to I45 are displayed in the image display area I40. On the other hand, in a case where the slider 82 is positioned near the right end and the second threshold value V2 is input, since the number of images having the blurriness value equal to or smaller than the second threshold value V2 is large, and a relatively large amount of images I51 to I62 are displayed in the image display area I50. The images I41 to I45 and I51 to I62 displayed in the image display areas I40 and I50 may be images input by the user or sample images. In a case where there are too many images to be displayed in the image display areas I40 and I50 among the images input by the user, the number of images proportional to the input second threshold value V2 may be displayed in the image display areas I40 and I50.

Figure 15:
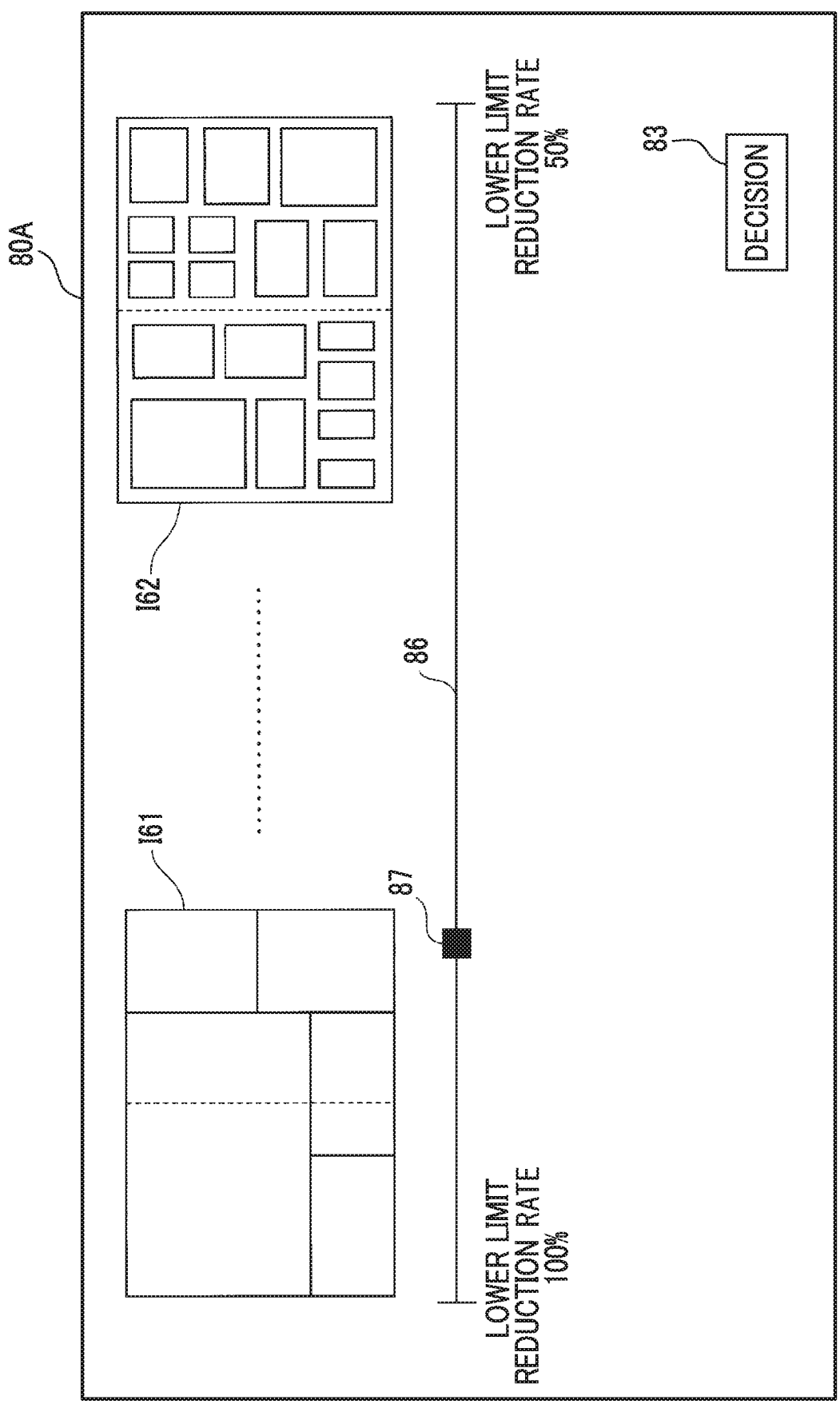
FIG. 15 is an example of an image ratio setting window.

FIG. 15 is an example of an image ratio setting window 80A after the second threshold value V2 is set as above.

The second threshold value V2 is set, the number of images that can be used for printing with the enlargement/reduction rate of equal to or larger than 100% is decided, thereafter, it is possible to further ask the user what layout to use. That is, it is possible to ask the user to give importance on which of the first policy of laying out by using only the image that can be used with the enlargement/reduction rate of equal to or larger than 100%, and the second policy of laying out by increasing the image which satisfies the second threshold value V2 by reducing the size of the image while considering the second threshold value V2. A slide bar 86 extending right and left is formed, and a slider 87 is movable on the slide bar 86 using the mouse 9. The user can decide to give importance on which of the first policy and the second policy for the images used in the album by using the slider 87. In a case where the slider 87 is moved to the left, the first policy is given importance, and the number of images to be used in the album remains small, and in a case where the slider 87 is moved to the right, the second policy is given importance, and the number of images to be used in the album increases. The lower limit reduction rate in a case where the second policy is given importance (in a case where the slider 87 is moved to the rightmost side) need only be appropriately determined, and the lower limit reduction rate may be determined such that an image satisfying the second threshold value V2 in a case of reduction by, for example, equal to or larger than 50% may be used. The slider 87 shows how much the user allows the lower limit reduction rate from 100% on the left side to 50% on the right side. The layout sample images I61 and I62 showing the number of images according to the position of the slider 87 are displayed on the upper side of the slide bar 86. Although two layout sample images I61 and I62 are displayed in FIG. 15, three or more layout sample images may be displayed.

The layout sample image I61 shows an album with a small number of images, and the layout sample image I62 shows an album with a large number of images.

Since the number of images that can be used in the album depends on the allowable reduction rate represented by the slider 87, the number of images that can be used in the album can increase or decrease by adjusting the allowable reduction rate. For example, with the allowable reduction rate input by the user, since the number of images that can be used in the album is small and the blurriness value is large, the images that the user originally wanted to use may be excluded from the image group that can be used in the album, and the album desired by the user cannot be generated. The above case is likely to occur in a case where the reduction rate of 100% on the left side is set. In such a case, for example, the allowable reduction rate is changed such that the image with poor image quality can be used. Then, the number of images that can be used in the album can increase, and the album desired by the user can be generated while considering the second threshold value V2 regarding the blurriness value.

Figure 16:
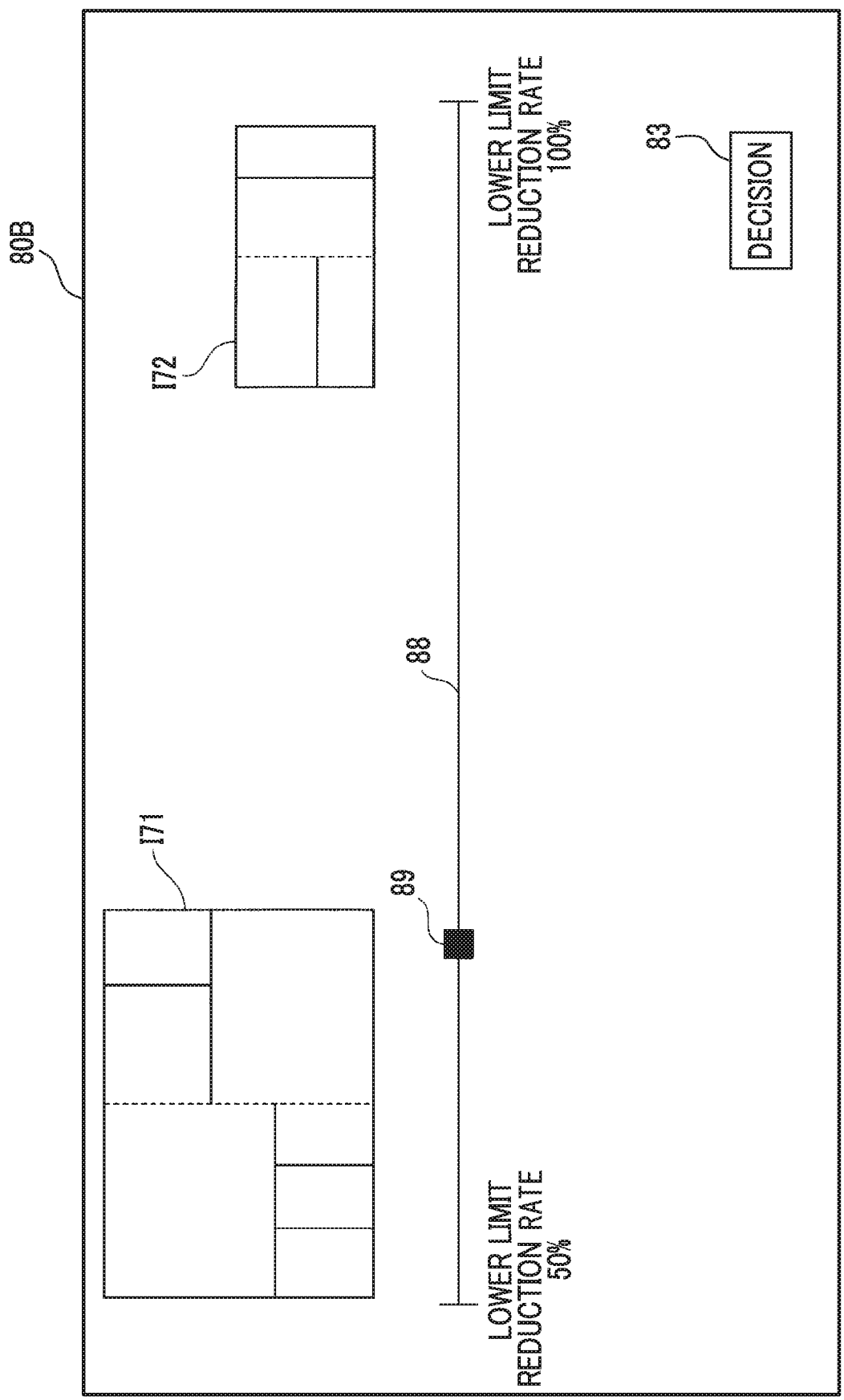
FIG. 16 is an example of an album size setting window.

FIG. 16 is an example of an album size setting window 80B after the second threshold value V2 is set as above.

The second threshold value V2 is set, the number of images that can be used for printing with the enlargement/reduction rate of equal to or larger than 100% is decided, thereafter, it is possible to further ask the user the size of the album. That is, it is possible to ask the user to give importance on which of the third policy of generating the album by using only the image that can be used with the enlargement/reduction rate of equal to or larger than 100%, and the fourth policy of generating the album by increasing the image which satisfies the second threshold value V2 by reducing the size of the image while considering the second threshold value V2. A slide bar 88 extending right and left is formed, and a slider 89 is movable on the slide bar 88 using the mouse 9. The size of the album to be created can be decided using the slider 89. In a case where the slider 89 is moved to the left, the fourth policy is given importance, the large album with more images (including the reduced image) is obtained, and in a case where the slider 89 is moved to the right, the small album (with only image that can be used with the enlargement/reduction rate equal to or larger than 100%) is obtained. The lower limit reduction rate in a case where the fourth policy is given importance (in a case where the slider 89 is moved to the leftmost side) need only be appropriately determined, and the lower limit reduction rate may be set such that an image satisfying the second threshold value V2 in a case of reduction by, for example, equal to or larger than 50% may be used. The slider 89 shows how much the user allows the lower limit reduction rate from 50% on the left side to 100% on the right side. The album sample images I71 and I72 showing the number of albums according to the position of the slider 89 are displayed on the upper side of the slide bar 88. Although two album sample images I71 and I72 are displayed in FIG. 16, three or more album sample images may be displayed.

The album sample image I71 shows a large size album, and the album sample image I72 shows a small size album. For large album, the image attachment area is specified so that the number of images printed on the album is relatively large, and for small album, the image attachment area is specified so that the number of images printed on the album is relatively smal.

As described above, since the number of images that can be used in the album depends on the allowable reduction rate represented by the slider 89, the number of images that can be used in the album can increase or decrease by adjusting the allowable reduction rate. For example, with the allowable reduction rate input by the user, since the number of images that can be used in the album is small and the blurriness value is large, the images that the user originally wanted to use may be excluded from the image group that can be used in the album, and the album desired by the user (large size album) cannot be generated. The above case is likely to occur in a case where the reduction rate of 100% on the right side is set. In such a case, for example, the allowable reduction rate is changed such that the image with poor image quality can be used. Then, the number of images that can be used in the album can increase, and the large size album desired by the user can be generated while considering the second threshold value V2 regarding the blurriness value.

Figure 17:
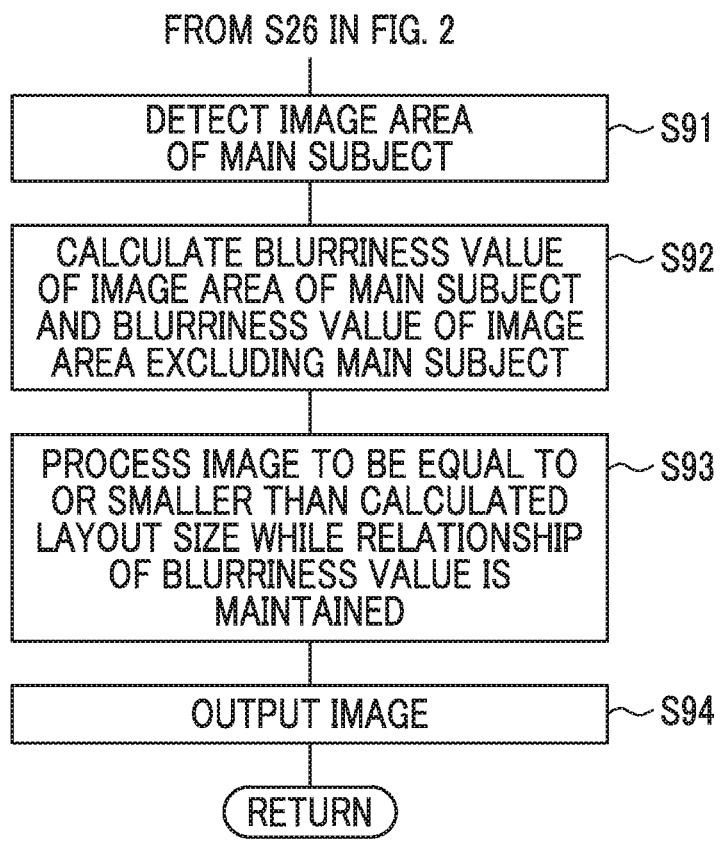
FIG. 17 is a flowchart showing a part of the processing procedure of the image layout size calculation apparatus.
Figure 18:
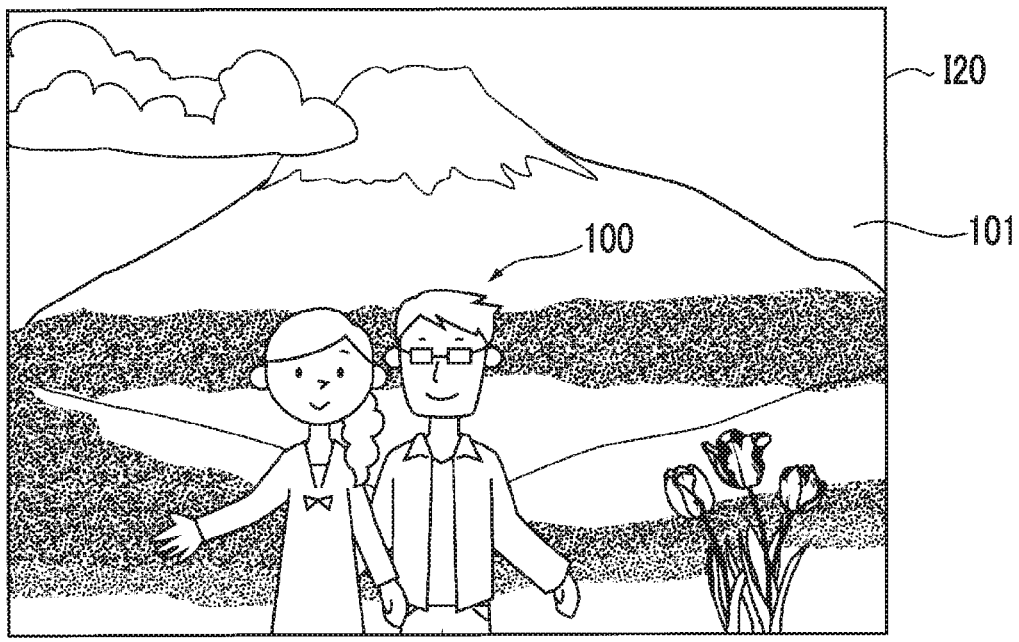
FIG. 18 is an example of an image.

FIGS. 17 and 18 show other embodiments, in which a relationship of the blurriness degrees between the main subject and the background in a case of imaging is maintained for the output image.

FIG. 17 is a flowchart showing a part of the processing procedure of the image layout size calculation apparatus 1, which is performed after the processing of step S26 in the flowchart shown in FIG. 2. FIG. 18 is an example of a captured image.

As shown in FIG. 18, an image area 100 of the main subject in the image I20 is detected by the CPU 2 (step S91). In the image I20, the blurriness value of the detected image area 100 of the main subject and the blurriness value of the other image area 101 excluding the image area 100 of the main subject are calculated by the CPU 2 (blurriness value calculation unit) (step S92).

The image having a size equal to or smaller than the calculated layout size is processed (enlarged or reduced) by the CPU 2 (image processing unit) while the relationship between the blurriness value of the image area 100 of the main subject and the blurriness value of the other image area 101 is maintained (step 93). The image subjected to the image processing is output, for example, printed by the printer 14 (step S94).

In a case where the main subject is focused and the background is intentionally blurred in a case of imaging, in a case where the size of the image is reduced, the blurriness of the background may disappear. According to the above embodiments, the relationship of the blurriness degrees between the main subject and the background can be maintained even in a case where the size of the image is reduced.

In the above embodiments, the image layout size calculation apparatus 1 may be realized by using a personal computer or the like, or by using a multifunctional mobile phone such as a smartphone or a plate computer such as a tablet.

The processing unit executing the above processing include, in addition to the CPU 2 executing the software and functioning as the various processing units, a programmable logic device whose circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC).

One processing unit may be configured by one of these various processors, or two or more processors of the same type or different types (for example, a plurality of FPGAs, or a combination of the CPU and the FPGA). As an example of configuring a plurality of processing units with one processor, first, as represented by a computer such as a client computer or a server, there is a form in which one processor is configured by a combination of one or more CPUs and software, and the processor functions as a plurality of processing units. Second, as represented by a system on chip (SoC), there is a form in which a processor is used that realizes the functions of the entire system including a plurality of processing units with a single integrated circuit (IC) chip. As described above, the various processing units are configured by one or more of the above various processors as a hardware structure.

Furthermore, the hardware structure of these various processors is, more specifically, an electric circuit in which circuit elements such as semiconductor elements are combined.

What is claimed is:

1. An image layout size calculation apparatus comprising:
   a blurriness value decision unit that decides a blurriness value, which represents a blurriness degree, of equal to or smaller than a first threshold value among blurriness values for image areas, from one image; and
   a layout size calculation unit that calculates a layout size of the image in which the blurriness value is equal to or smaller than a second threshold value based on the blurriness value decided by the blurriness value decision unit, the number of pixels of the image, and resolution of an output apparatus of the image.

2. The image layout size calculation apparatus according to claim 1, further comprising a sharpness emphasizing unit that emphasizes a sharpness of the image,
   wherein the layout size calculation unit calculates the layout size of the image in which the blurriness value of the image is equal to or smaller than the second threshold value based on the blurriness value decided by the blurriness value decision unit, the number of pixels of the image, the resolution of the output apparatus of the image, and an emphasis degree of a sharpness by the sharpness emphasizing unit.

3. The image layout size calculation apparatus according to claim 1, further comprising an output control unit that makes the image fit into a frame having a size equal to or smaller than the layout size calculated by the layout size calculation unit, and causes the output apparatus to output the image.

4. The image layout size calculation apparatus according to claim 3, wherein the output control unit makes the image fit into the frame having the size equal to or smaller than the layout size calculated by the layout size calculation unit, sets the resolution of the image to be equal to or smaller than the resolution capable of being distinguished at an observation distance, and causes the output apparatus to output the image.

5. The image layout size calculation apparatus according to claim 3, further comprising:
   a frame designation unit that designates the frame for outputting the image;
   a warning unit that issues a warning in response to the size of the frame designated by the frame designation unit being larger than the layout size calculated by the layout size calculation unit; and
   an output command inputting unit that inputs an output command,
   wherein the output control unit makes the image fit into the frame designated by the frame designation unit and causes the output apparatus to output the image, in response to the output command being input from the output command inputting unit after the warning unit issues a warning.

6. The image layout size calculation apparatus according to claim 3, further comprising:
   a blurriness value calculation unit that calculates a blurriness value representing a blurriness degree of an image area of a main subject in the image and a blurriness value representing a blurriness degree of an image area excluding the main subject; and
   an image processing unit that performs image processing that maintains a relationship between the blurriness value representing the blurriness degree of the image area of the main subject and the blurriness value representing the blurriness degree of the image area excluding the main subject which are calculated by the blurriness value calculation unit, with respect to the image fitted into the frame having the size equal to or smaller than the layout size calculated by the layout size calculation unit, wherein the output control unit makes the image subjected to the image processing by the image processing unit fit into the frame having the size equal to or smaller than the layout size calculated by the layout size calculation unit, and causes the output apparatus to output the image.

7. The image layout size calculation apparatus according to claim 1, further comprising a threshold value inputting unit that inputs the second threshold value, wherein the layout size calculation unit calculates the layout size in which the blurriness value is equal to or smaller than the second threshold value input by the threshold value inputting unit based on the blurriness value decided by the blurriness value decision unit and the resolution of the output apparatus of the image.

8. The image layout size calculation apparatus according to claim 7, further comprising an image selecting unit that selects an image having an allowable blurriness degree among a plurality of sample images having different blurriness degrees, wherein the threshold value inputting unit inputs the second threshold value corresponding to the image selected by the image selecting unit.

9. The image layout size calculation apparatus according to claim 1, wherein the blurriness value decision unit decides a smallest blurriness value in the image from one image.

10. The image layout size calculation apparatus according to claim 1, wherein the layout size calculation unit calculates the layout size in which the blurriness of the image is eliminated, based on the blurriness value decided by the blurriness value decision unit, the number of pixels of the image, and the resolution of the output apparatus of the image.

11. The image layout size calculation apparatus according to claim 1, wherein the layout size calculation unit calculates a maximum layout size in which the blurriness value is equal to or smaller than the second threshold value based on the blurriness value decided by the blurriness value decision unit, the number of pixels of the image, and the resolution of the output apparatus of the image.

12. An image layout size calculation method comprising:
causing a blurriness value decision unit to decide a blurriness value, which represents a blurriness degree, of equal to or smaller than a first threshold value among blurriness values for image areas, from one image; and
causing a layout size calculation unit to calculate a layout size of the image in which the blurriness value is equal to or smaller than a second threshold value based on the blurriness value decided by the blurriness value decision unit, the number of pixels of the image, and resolution of an output apparatus of the image.

13. A non-transitory recording medium storing a computer-readable program that controls a computer of an image layout size calculation apparatus to execute:
deciding a blurriness value, which represents a blurriness degree, of equal to or smaller than a first threshold value among blurriness values for image areas, from one image; and
calculating a layout size of the image in which the blurriness value is equal to or smaller than a second threshold value based on the blurriness value decided, the number of pixels of the image, and resolution of an output apparatus of the image.

* * * * *